Jacques Gilbert Pinault,
Jean Paul Lallet, and
Henri Amédée Basile Carbonnel

United States Patent Office 3,435,145
Patented Mar. 25, 1969

3,435,145
REMOTE-CONTROLLED ALARM NETWORKS
Jacques Gilbert Pinault, Chatillon-sous-Bagneux, Jean Paul Lallet, Clamart, and Henri Amédée Basile Carbonnel, Antony, France, assignors to Société Anonyme: Groupement Atomique Alsacienne Atlantique (G.A.A.A.), Le Plessis-Robinson, France, a French corporation
Filed Nov. 24, 1965, Ser. No. 509,571
Claims priority, application France, Nov. 26, 1964, 996,434
Int. Cl. H04m 11/00
U.S. Cl. 179—2         3 Claims

ABSTRACT OF THE DISCLOSURE

Described herein is an electrical surveillance and alarm system which employs two detectors to sense current changes in wiring between main and satellite stations, a synoptic panel designating particular satellites, an audible warning device, satellite selectors, plug-in measuring circuits to determine the circuit anomaly, and an alarm condition synoptic panel.

---

The present invention relates to improvements in remote-controlled alarm networks, and more particularly to interphone communication networks and, generally, to intercommunication systems for supervision of extended areas (for example, in case of accidents, fire and the like) or of buildings with many rooms (apartments, plants, offices, laboratories and the like).

Such remote-controlled networks, which comprise a central set and a plurality of satellite sets, are adapted to enable to receive, at a central set or station, the calls issued from numerous satellite sets or stations, to allow the central set to individually or in groups call the satellite sets, to enable to distinguish between priority, urgent calls and a normal call originating from each satellite set, and report to the central set any disturbances occurring in the service loop lines, such as: disconnection, short-circuit or grounding. In addition, these networks must convey the modulation and signalling signals over distances as long as 5 kilometers and use, for the connection between the central set or station and each satellite set, a two-wire line meeting the requirements of the Postal and Telecommunication Service. It is finally essential that such networks require hardly any maintenance or servicing, and the little servicing there is to do should be effected by a semi-skilled staff.

With a view to obtain such desirable results, a holding potential was up to the present resorted to, which flows through the lines connecting the central set with the satellite sets, and of which the intensity was being permanently measured.

In the present known technique, assemblies are being used including electro-mechanical relays of conventional type, but which present the drawback of requiring fastidious maintenance work by expert workmanship, while a reliable operation is nevertheless not entirely warranted. It has also been proposed to cause such networks to operate electrically in two stages one stage corresponding to an approximate detection and the following to a final and precise detection. These operating methods have not, however, met with satisfactory results.

It is therefore an object of this invention to eliminate the above mentioned drawbacks by omitting the electromagnetic relays in the remote-controlled alarm networks. According to the invention, there is provided, under well defined particular conditions, static relay assemblies including semiconductor or electronic passive components, the arrangement being such that a first rough detection takes place in the installation, followed by the accurate, sharp, detection.

Setting out from these teachings of the known art and from the fundamental conclusions mentioned, a remote-controlled alarm network controlled by a holding current including satellite sets or stations, connection lines between these sets and a central set or station, as well as intercommunication warning devices, comprises essentially:

A plurality of line cards the number of which is equal to the number of the connection lines individually arranged in one of these lines, each card carrying two printed circuits, one of which is set aside for the detection of the levels, plus or minus, of the holding current, the other for the logic, responsive to the indications of the first printed circuit and transmitting any modification thus detected; a synoptic localization panel, representative of the various satellite stations, and actuated by said second circuits of the line cards; a warning member connected to the localization panel and actuated thereby; a control panel connected to the localization panel; a line selector of any known type connected to said control panel; a card carrying the printed circuits necessary for effecting a series of checking measurements of the connection lines adapted to be plugged-in and connected to the selector; a discrimination panel for the checking results, connected to the measurement cards; a connection between the selector and said measurement card enabling the latter to be connected to a given line; an intercommunication assembly comprising modulation means for establishing the communication with a given satellite station.

Each line card traverses a chopping circuit of the line to which it is assigned and comprises actually two distinct printed circuits, comparatively interlocked with one another, one of which assuring the rough surveillance of the electric state of the line, while the other analyzing logically and in a known manner the information issued from the first circuit.

The plug-in measurement card, connected to the selector, includes a matching circuit, a chopping circuit and a level detector, the latter being a transistorized assembly providing a dynamic negative resistance.

A remote-controlled alarm network according to the invention is such that each line surveillance card is assigned to the permanent control of a transmission channel and causes, in case of a variation in one or in the other direction of the holding current, the lighting of one of the various signal lamps constituting the synoptic localization panel, which preferably is a topographic representation of the region covered by the network. Simultaneously, a sound warning device draws the attention of the operator who actuates the selector to connect up—without interrupting it—the two-wire appealing or faulty connection line to the measurement card which, by means of the synoptic discrimination panel, determines and displays one of the possible types of calls or one of the possible line faults.

A second arrangement may be provided making use of the same elements and components as above, except all those relating to intercommunication, to constitute a surveillance network of the open or closed states of the electric contacts.

As will be noted, the invention makes it possible to simultaneously control, by means of single two-wire line of several electric contacts, which may, for instance, be assigned to the control of the approaches of a building or of the various physical parameters by means of convenient detectors (fire, smoke, temperature, fluids leakage detectors and the like).

The individual surveillance card of the line comprising a detector unit and a logical assembly for a single line may advantageously be replaced by a composite card connected by several detectors to a plurality of lines, each one of the detectors being arranged to feed into a single logical circuit connected, in a known manner, to the synoptic localization panel.

As many measurement cards as desired may be provided, each corresponding to a given group of appeals or of anomalies, or of physical phenomena to be surveyed, discriminated or signalized, and a single or different cards may be simultaneously used in a same network, according to the various applications of the satellite sets.

Such network are themselves novel industrial products, which form another object of the invention.

The invention will be best understood from the following description and appended drawings, wherein.

Figure 1:
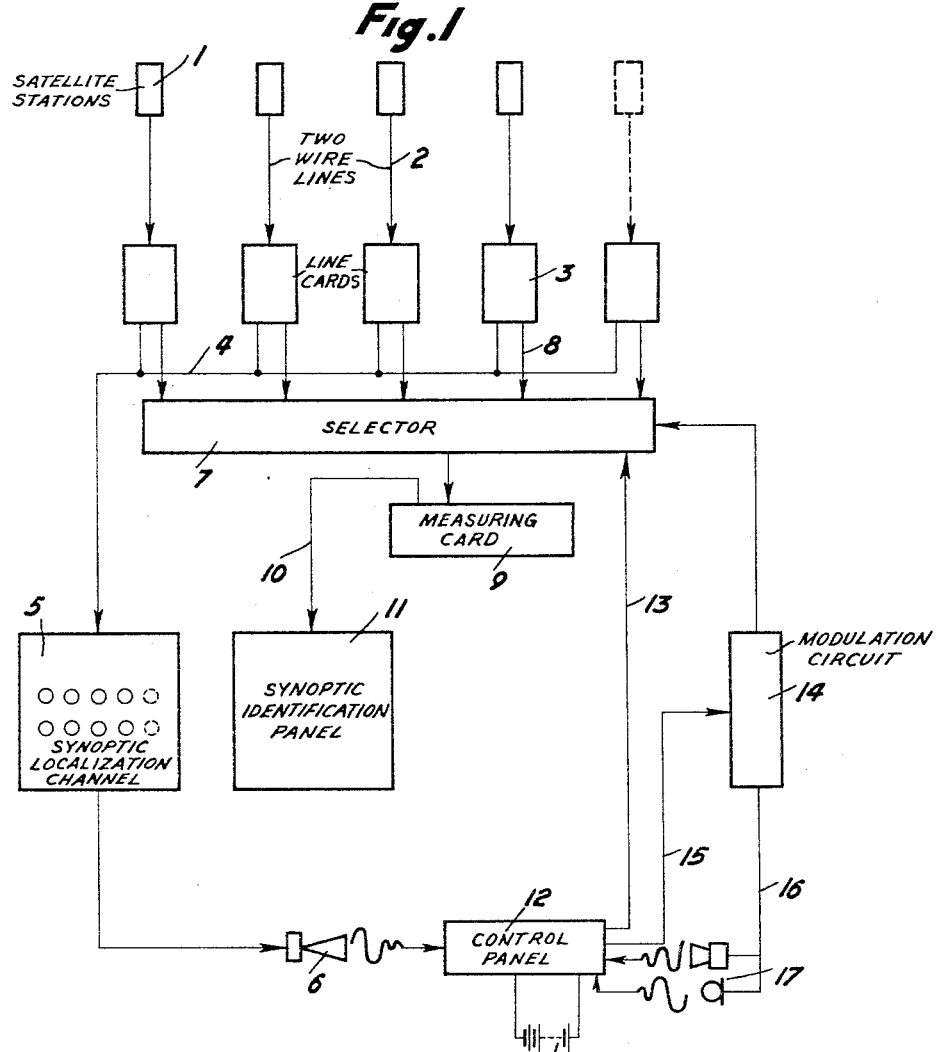
FIG. 1 is a diagrammatic general lay out of the network according to the invention.

Referring to the drawings, the remote controlled alarm network comprises a plurality of satellite sets or stations 1, a two-wire line 2 for each one of these stations and a line card 3 for each line. The line cards 3—which will be described in more detail later in this specification—are connected, on one side, by means of connecting line 4 to a synoptic localization panel 5, representative of the stations 1 and adapted to cause an appeal or an anomaly to appear thereon, said synoptic panel being, on the other hand, connected to an alarm device 6 preferably of an acoustic type, such as available on the market under the trademark Klaxon, for instance. The line cards 3 are, on the other hand, connected to a selector 7 controlled by the operator through a connection 8. Selector 7, on the other hand, is connected to a measuring card 9 which will be described hereinafter, and which is connected, through line 10, to a synoptic identification or fault panel 11. A control panel 12, actuated by the operator, is connected, on one hand, to selector 7 directly through line 13, on the other hand, along a modulation circuit 14 (audio-frequency amplifier) through the direct connection 15, a connector 16 enabling the use of intercommunication means 17 (loud-speaker and/or microphone) with the various satellite stations 1. A power source 18 including a storage battery associated to a regulator charger insures the supply of the assembly.

In order to facilitate the understanding of the present specification, the various elements of the network will be described at the same time as their individual operation and their cooperation.

A line card 3 is provided for each line 2 connected to a station 1. Each card is a printed circuit and presents a multi-pin connector of any known convenient type (not illustrated) and adapted to be plugged-in at one of its ends. The corresponding line 2 undergoes a chopping action through its associated card 3 which is adapted to achieve the permanent electrical surveillance, without the intervention of the operator. Card 3 comprises actually two distinct printed circuits, comparatively interlocked to one another, one of which assures the rough surveillance of the electric state of the line, while the other investigates logically, in a known manner, the information issued from the first circuit.

Figure 2:
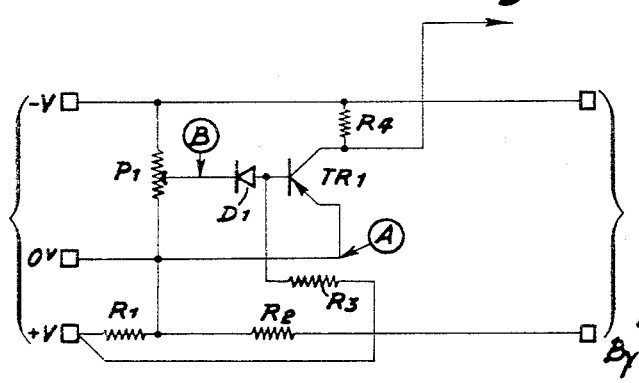
FIG. 2 illustrates the block diagram of one of the level detectors for a line card according to the invention.

The first circuit includes two level detectors adapted, respectively, to operate in case of an increase (or a decrease) of the holding current above (or below) a predetermined value. Such a level detector is illustrated in FIGURE 2 which will be explained for the case of a current increase (+I). The holding current (−V+V) flows through line 2, passes through resistances R–1 and R–2 across the terminals of which appears a voltage proportional to said current. This voltage, after having been reduced to a convenient value by means of an adjustable potentiometer P–1, is applied through a diode D–1 to the input of a transistor TR–1 arranged as a grounded-emitter. The adjustment of potentiometer P–1 is such that, normally, the potential of point B is very slightly positive going with respect to that of point A. Under these conditions, diode D–1 is nonconductive and resistance R–3 maintains transistor TR–1 in a state of nonconduction. If the holding current increases, a more negative going potential will appear at the junction of R–1 and R–2. This more negative potential causes the conduction of diode D–1 and is applied to the input of the transistor of which it thus causes the saturation, the voltage of the collector then passing from potential −V to potential 0 volt.

The second level detector is identical to the one just described, but the adjustment of potentiometer P–1 of this second detector is normally such, i.e. for the normal value of the holding current, that the point (corresponding to point B of the first detector) is slightly negative going to that of point A (−I); there is thus available an important level variation of the output voltage of the transistor, if the holding current decreases by a given value.

The triggering threshold of the detectors are adjusted with any desired accuracy through the adjustment of the potentiometers.

The first circuit thus formed of the two detectors provides therefore electrical informations as a function of an increase or of a decrease relative to the nominal value of the holding current. These electrical informations are of a level such that they may be directly used by the logical assemblies of the conventional type constituting the second circuit which equip the line card.

This second circuit 19—not illustrated in the drawing—comprises transistors and allows the storage of operation —even of a fleeting nature—of one of the two detectors +I and −I of the holding current level. The number of transistors of this second circuit is fixed, according to the general rules, as a function of the logic utilized and of the informations to be transmitted. Its object, therefore, is to record a call or a fault on line 2 to which it was assigned, and to draw the attention of the operator by causing the Klaxon 6 to come into operation, as well as the operation of the signal of the synoptic panel 5 corresponding to the line considered.

The synoptic panel 5 comprises as many groups of two lamps as there are lines to constitute the network; these pairs of lamps, necessary for a reliable operation, are arranged at adequate points of a panel representing topographically the regions covered by the installation.

In case of a fault or of a call on line 2, corresponding card 3 causes the lighting at a fixed state of a group of two lamps.

When the operator, as will be explained later in this specification, takes in charge the calling or faulty line, the said two lamps change into a blinker light and are turned off as soon as the operator has finished his connection, provided only that the fault or the call of the corresponding line has disappeared; if not, the group of lamps return to a fixed-signal light.

Figure 3:
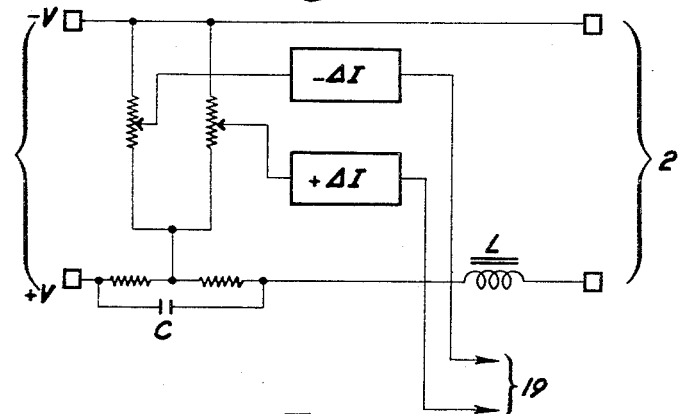
FIG. 3 is a diagram of the equipment of the measuring circuits.

In order to take into consideration the fact that lines 2 must transmit high-level, audio-frequency signals, each line card is fitted with an inductance coil L and with a capacitance C of a high value; in FIGURE 3, there is shown the corresponding circuit with the two detectors +I and —I of the variations supported by the holding current. This inductance L and the capacitance C are adapted to prevent any modulation return in the logical or detection circuits, as well as to rise to a maximum the impedance of the measuring circuits necessary brought in parallel back to the line terminals.

Figure 6:
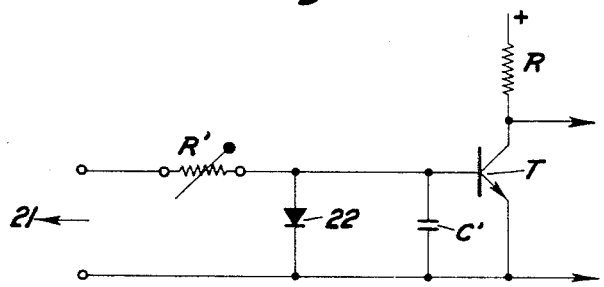
FIG. 6 illustrates an embodiment of a level detector for the synoptic discrimination panel shown in FIG. 1.

The measuring card resorted to according to the invention intervenes to display on the discriminator panel 11 the faults or the calls appearing as an intensity variation of the holding current crossing line 2. Any number of measuring cards may be provided equipped, respectively, such as to assure measuring sets corresponding to anomalies of one or a plurality of types selected or to calls to be corrected or to be recorded. Each measuring card is a printed circuit comprising (FIGURE 4) a matching element 20 and a chopper element 21, as well as a series of electric level detectors (trigger circuits) 22 (FIGURE 6). This card is connected to selector 7, of any known type; upon the direct action exercized by the operator on panel 12, after a warning call of device 6 and localization on synoptic panel 5, lines 13 and 15 connect line 2 to the warning on selector 7, and, on one hand, on card 9, and, on the other hand, on modulation circuit 14 and consequently on intercommunication arrangement 17.

Figure 5:
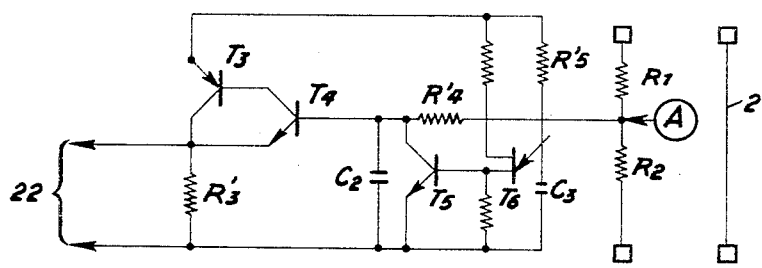
FIG. 5 is one of the measuring circuits of FIG. 4.

Selector 7, connected to card 3 of line 2 considered, extracts the signal at the junction point of resistances R–1 and R–2 of card 3. This signal is a voltage characterized by the state of line 2; in order for the measuring devices not to disturb the same, an impedance-reducing amplifier is provided (FIGURE 5) restoring substantially integrally, and at least proportionally, to the terminals of resistance R'3 the voltage available at point A.

The usual impedance matching device 20 consists of transistors T–3 and T–4; chopper 21 comprises transistors T–5 and T–6 which enable to periodically short-circuit, at a fixed frequency, through R'5 and C–3, the input of the impedance matching device, without however interfering with the voltage at point A, on account of the presence of the insulating resistance R'4, the value of which is very great relative to the values of resistances R–1 and R–2. As seen, assembly 20–21 equally ensures the desired zero settings.

At the output of said assembly 20–21, there is thus available a square signal the peak-to-peak voltage of which is a direct function of the holding current in the line to be surveyed. This square signal is then diverted at least onto a level detector 22. There are as many detectors 22 as there may occur line call or faults and as many corresponding display means (such as signal lamps for instance) on the synoptic discrimination panel 11. The inputs of the level detectors are driven in parallel.

Figure 4:
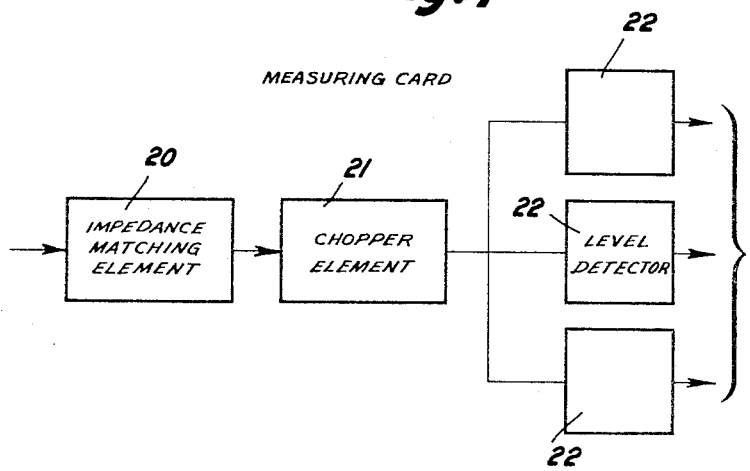
FIG. 4 is a block diagram of the measuring circuits.

In FIGURE 4, three trigger circuits 22 are illustrated connected to the usual logic circuits arranged.

Figure 7:
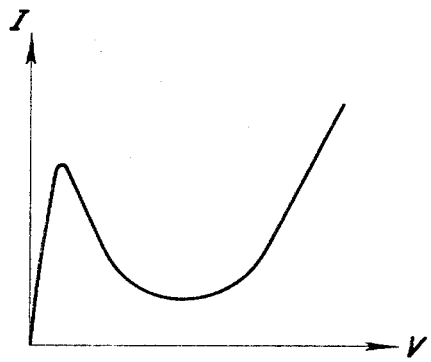
FIG. 7 shows a curve of dynamic resistance of the detector illustrated in FIG. 6.

As level detectors 22, a device is used having a dynamic negative resistance, the characteristic of which is shown on curve of FIGURE 7. To this end, tunnel diodes—such as those known as "Esaki" or backward diodes—as well as unijunction or double-base transistors and conventional transistor arrangements which provide such a negative dynamic resistance. In FIGURE 6, detector 22 comprises, among others, a tunnel diode of the Esaki type and a transistor T providing a high output level, combined with an adjustable resistance R', a fixed resistance R and a capacitor C'.

Figure 8:
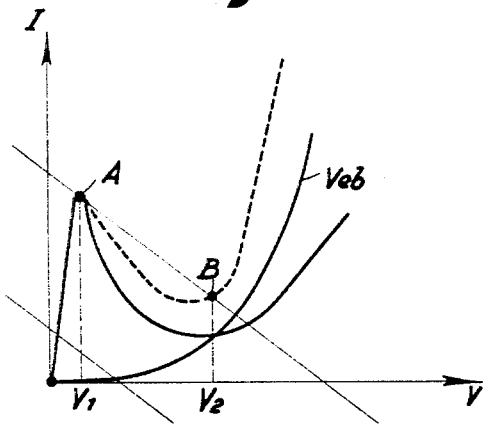
FIG. 8 is a graph representing the load line and the composite characteristic resulting from the association, according to the invention, of a transistor and of a negative-resistance element.

The measurement card 9 is adapted to detect the threshold of a voltage, said voltage being applied across the terminals of a negative resistance element 22 through a variable resistance R'. It is seen (FIGURE 8) that the load line representative of said resistance is moving parallel to itself along the voltage axis, when the input voltage increases.

The initial operating point occurs at the intersection of the load line and of the dynamic resistance curve, the adjustment of the load resistance R' causing it to be set at A for an input voltage which is slightly lower to that of the trigger threshold, When the current corresponding to voltage V–1 is overtaken, the operating point will move very rapidly towards B, thus causing the transistor T to be conductive and its voltage $V_{eb}$ to greatly increase and become equal to V–2.

A substantial voltage variation is then available across the terminals of resistance R. This voltage is directly used to control the logical circuits for the grouped informations adapted to the synoptic discrimination panel 11. The logical re-arrangement of the informations collected is effected as usual as a function of the informations to be displayed on the discrimination panel 11. The latter consists of a series of boxes or enclosures 23 on which luminous letterings may appear. The number of such boxes is a function of the different characteristic calls or faults relative to a single channel as it is desired to display, and therefore a function of the possibilities of the measurement card provided, i.e., of that corresponding to the highest checking number which may be required from the network. As a safety measure, each box or enclosure is fitted with two lamps connected in parallel.

All such boxes are controlled directly by the measurement card 9. They display in clear the result of the electric measurements effected by said card, such as it logically re-arranged, and which light up only upon the operator having selected a call or fault channel.

It will be noted, in connection with the above, that the informations provided on the synoptic panel 11, rather than being displayed, or at the same time they are displayed, may be transcribed by a teletype unit or recorded on tape or on a drum of the magnetic type, through any conventional means.

The modulation circuit 14 mentioned hereinabove and adapted to ensure the intercommunications is desirably a printed-circuit card, grouping a voltage pre-amplifier and a power amplifier, preferably transistorized, for a modulated power in a convenient frequency band range (for instance 0.5 to 10 w. and 300 to 3000 c./s.).

Figure 9:
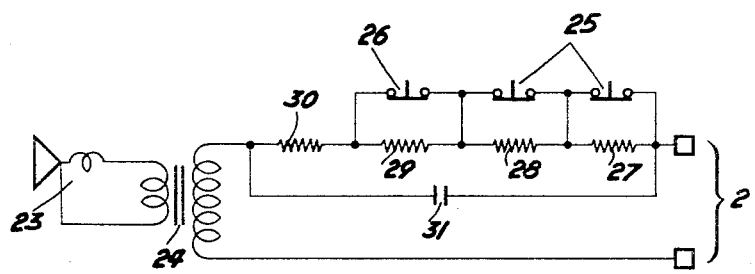
FIG. 9 illustrates, by way of example, a satellite station in the shape of an alarm post.

By way of example of a satellite station which may be utilized in a network according to the invention, there is illustrated, in FIGURE 9, a warning post arrangement consisting of a sealed casing (not shown in the drawing) inside of which are arranged a loud-speaker 23 (preferably protected by a wire-netting), with its matching transformer 24 for line 2 to the loud-speaker, a three-way switch 25 controlled by a safety key and a window-breaking switch 26. The two first positions of switch 25 enable the holding current to be reduced in various ways and in a manner to be differentiated by the central station; the third position of switch 25 enables the key to be extracted and prohibits the opening of the warning post by any other means. Finally, the casing also contains a set of resistances 27, 28 29 and 30, as well as a capacitor 31 connected in parallel on said resistances, the number of which exceeds by one unit the number of the contacts adapted to be surveyed; the fourth resistance (30) enables to remote-control, as well known, the short-circuit of the line. Capacitor 31 transmits to transformer 24, and therethrough to the loud-speaker 23, all the alternative signals occurring on line 2.

Figure 10:
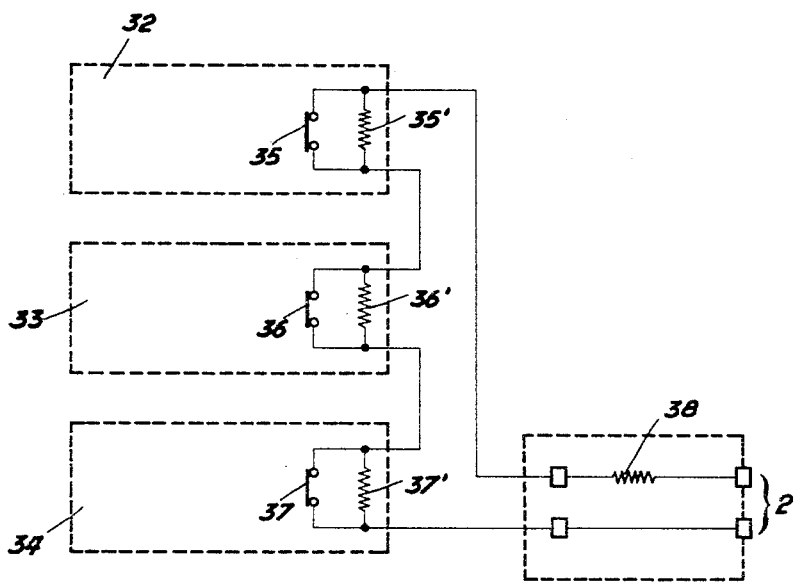
FIG. 10 is a block diagram of a detector assembly for the surveillance of three physical parameters.

In FIGURE 10, there is illustrated a satellite station adapted, for instance, for the surveillance of physical phenomena which result in the operation of an electric switch, such as: temperature, power, level, fire, leakage control, etc. surveillance of the access to buildings, safes and the like. As is seen on the drawing there is provided the physical detectors 32, 33, 34 acting on contacts 35, 36, 37, and equipped each with a resistance 35', 36', 37' respectively adapted to characterize the holding current of line 2; the assembly is connected to line 2 via a holding resistance 38, contacts 35, 36 and 37 opening only in case one of the phenomena surveyed is acting.

As relates to the connection lines between the satellite and the central stations, cables of a reduced cross-section may be used; preferably, each connection terminating at the central station is achieved by a two-wire, insulated and shielded cable.

It is easily seen that the networks equipped according to the invention present substantial advantages which make them highly desirable for various uses. For instance, these networks corresponding to a large reduction in floor space for a given equipment, are not effected by vibrations, may operate in an exploding atmosphere on account of the absence of electric arcs, and are of a simple construction on account of their wide operating temperature range. On the other hand, these networks do not involve any ventilation problems, the cable cross-sections may be reduced due to the reduced currents carried, so that the voltages necessary may be as low as possible on account of the absence, in practice, of any line losses. Finally, due to the use of semiconductors, there is no ageing to be expected, thus avoiding any periodic adjustments and the maintenance is very simple and therefore economic.

It is to be understood that various changes and modifications may be brought to the installations described or to their components, without departing from the spirit and scope of the invention.

Thus, it is perfectly possible to bring the localization synoptic panel to act simultaneously in response to the warning assembly of the operator and to the automatic switching-in control of the selector, of the measurement card and of an intercommunication circuit.

What we claim is:

1. In a remote-controlled alarm network, a plurality of detecting satellite stations arranged each at a given position of the region to be surveyed, a two-wire conducting line extending from each one of these stations, a line card connected to each satellite station, on each of said cards a first printed circuit connected to the two-wire line of the station of said line and on each line card a second printed circuit responsive to the current flowing through the first printed circuit, a localization synoptic panel with inlets and outputs and representative means arranged on said panel, each of said representative means representing individually one of the satellite stations according to their distribution in said region to be surveyed, a two-wire line connecting said means representative of a satellite station, through one inlet of the said panel, an output of said synoptic panel connected to each of said representative means, an alarm member electrically connected to said output, a control assembly adapted to be actuated by said localization synoptic panel, a line selector connected through individual electric links to each one of the second printed circuits on said line cards, a direct electric connection between said line selector and the control assembly, a measurement card on which are marked printed circuits enabling at least certain measurements to be effected, which measurements are necessary for checking the two-wire lines, means for connecting said printed circuits of the measurement card to one of the individual links of the selector, a synoptic panel carrying call or fault identification means, intercommunication means between the control panel and the selector adapted to establish the communication with any one of the satellite stations, a direct current electric power supply feeding the control assembly and subsequently the various printed circuits, the two-wire lines and the detecting stations.

2. In a remote-controlled alarm network according to claim 1, on each line a pin-plug, with the first printed circuit comprising two level detectors, respectively, of an increase or a decrease of the current flowing through the line, each of said detectors being connected to the second printed circuit, and means provided on the line including the two detectors in order to enable the passage of audio-frequency high level signals.

3. In a remote-controlled alarm network according to claim 1, a measurement card comprising connecting pins on the outputs of the selector, with its printed circuit including a matching element, a chopper element and a series of electric level detectors; said detectors, which provide a negative dynamic resistance, acting, through the connection between the measurement card and the identification panel, on the identification or fault means of said panel.

References Cited

UNITED STATES PATENTS 2,919,307  12/1959  Bachelet et al. _____ 179—5

ROBERT L. GRIFFIN, *Primary Examiner.*

J. A. ORSINO, JR., *Assistant Examiner.*

U.S. Cl. X.R.

340—164